United States Patent
Kobayashi

(10) Patent No.: US 6,714,242 B1
(45) Date of Patent: Mar. 30, 2004

(54) IMAGE PROCESSING APPARATUS, IMAGE PROCESSING METHOD, AND CAMERA

(75) Inventor: Atsushi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/206,620

(22) Filed: Dec. 7, 1998

(30) Foreign Application Priority Data

Dec. 8, 1997 (JP) ............................................. 9-336744

(51) Int. Cl.$^7$ .......................... H04N 9/083; H04N 1/46; G06K 9/40; G06K 9/32
(52) U.S. Cl. ...................... 348/272; 348/273; 358/525; 382/300; 382/266
(58) Field of Search ................................ 348/272, 273, 348/275, 280, 266, 268; 358/525; 382/266, 263, 300, 299

(56) References Cited

U.S. PATENT DOCUMENTS

| | | | |
|---|---|---|---|
| 5,054,100 A | * 10/1991 | Tai | 382/300 |
| 5,347,599 A | * 9/1994 | Yamashita et al. | 382/278 |
| 5,390,264 A | * 2/1995 | Ishihara et al. | 382/266 |
| 5,552,827 A | * 9/1996 | Maenaka et al. | 348/266 |
| 5,652,621 A | * 7/1997 | Adams et al. | 348/272 |
| 5,703,968 A | * 12/1997 | Kuwahara et al. | 382/266 |
| 5,805,217 A | * 9/1998 | Lu et al. | 348/273 |
| 5,852,468 A | * 12/1998 | Okada | 348/272 |
| 5,903,681 A | * 5/1999 | Rueby et al. | 382/266 |
| 6,046,772 A | * 4/2000 | Howell | 348/273 |
| 6,181,376 B1 | * 1/2001 | Rashkovskiy et al. | 348/273 |
| 6,229,578 B1 | * 5/2001 | Acharya et al. | 382/162 |
| 6,295,087 B1 | * 9/2001 | Nohda | 348/273 |
| 6,339,479 B1 | * 1/2002 | Kishimoto | 382/300 |

FOREIGN PATENT DOCUMENTS

JP  07236147 A  * 9/1995  ............ H04N/9/07

OTHER PUBLICATIONS

Sakamoto et al.; "Software Pixel Interpolation for Digital Still Cameras Suitable for 32-bit MCU"; Nov. 1998; IEEE Transaction on Consume Electronics, vol. 44, No. 4; pp. 1342–1352.*

* cited by examiner

*Primary Examiner*—Wendy R. Garber
*Assistant Examiner*—John M. Villecco
(74) *Attorney, Agent, or Firm*—Frommer Lawrence & Haug LLP; William S. Frommer; Gordon Kessler

(57) ABSTRACT

In an image processing apparatus for processing the output signal of a CCD area sensor having a color filter with a Bayer arrangement of red, green, and blue primary colors, a VH-correlation detecting section calculates, according to four pieces of pixel information in four directions of the right and left directions (horizontal direction) and the upper and lower directions (vertical direction) from a pixel to be interpolated, correlation values in the four directions, for example, for green. According to these correlation values, interpolation coefficients are determined. Interpolation data is multiplied by the interpolation coefficients in multipliers and the results are summed up in adders to implement interpolation processing.

18 Claims, 11 Drawing Sheets

| G00 | R01 | G02 | R03 | G04 | R05 |
|-----|-----|-----|-----|-----|-----|
| B10 | G11 | B12 | G13 | B14 | G15 |
| G20 | R21 | G22 | R23 | G23 | R24 |
| B30 | G31 | B32 | G33 | B34 | G35 |
| G40 | R41 | G42 | R43 | G44 | R45 |
| B50 | G51 | B52 | G53 | B54 | G55 |

IMAGE PROCESSING APPARATUS, IMAGE PROCESSING METHOD, AND CAMERA

BACKGROUND OF THE INVENTION

1. Field of the Invention

The present invention relates to image processing apparatuses, image processing methods, and cameras, and more particularly, to an image processing apparatus and an image processing method for processing the output signal of a solid-state imaging device having a color filter with the specified color arrangement on a light receiving plane and a camera using the image processing apparatus.

2. Description of the Related Art

In an image processing apparatus for processing the output signal of a solid-state imaging device having a color filter with, for example, a Bayer color arrangement of primary colors on a light receiving plane, since each color is located not continuously on the color filter, interpolation processing is performed so as not to reduce the impression of resolution. In a conventional image processing apparatus of this type, correlation values are calculated only in two directions, such as the two opposite directions (right and left directions) in the horizontal direction or the two opposite directions (upper and lower directions) in the vertical direction, and interpolation is performed according to the calculated correlation values. In other words, whether horizontal stripes or vertical stripes are viewed is determined from information of pixels around a pixel to be interpolated, for example, five by five pixels around the pixel to be interpolated. In a case in which horizontal stripes are viewed, interpolation is performed by the use of the signals of the pixels located at both sides in the horizontal direction of the pixel to be interpolated. In a case in which vertical stripes are viewed, interpolation is performed by the use of the signals of the pixels located at both sides in the vertical direction of the pixel to be interpolated.

Although the conventional image processing apparatus, which performs interpolation with the use of correlation detection only in two directions, is effective for edges in the horizontal and vertical directions, it cannot detect the intersection of a horizontal edge and a vertical edge, or a correct edge at a broken or bent segment, if the edges are about one pixel wide. As for a diagonal line, the apparatus cannot determine whether horizontal correlation or vertical correlation is strong and is likely to average (perform average interpolation) the results of processing at a horizontal edge and processing at a vertical edge.

Therefore, the conventional image processing apparatus causes some problems, such as a blurred image with an impression of low resolution or a missing line at a place where it should not be, at the portions described above.

SUMMARY OF THE INVENTION

Accordingly, it is an object of the present invention to provide an image processing apparatus and an image processing method which allow successful interpolation processing to be performed even at a broken or bent line and a right-angled corner, and a camera using the image processing apparatus.

The foregoing object is achieved in one aspect of the present invention through the provision of an image processing apparatus for processing the output signal of a solid-state imaging device having a color filter with the specified color arrangement on a light receiving plane, including: a correlation-value calculation circuit for calculating, according to four pieces of pixel information in four directions which form angles multiples of 90 degrees with each other, the right, left, upper, and lower directions, from a pixel to be interpolated, correlation values in the four directions; a coefficient determination circuit for determining interpolation coefficients according to the correlation values in the four directions calculated by the correlation-value calculation circuit; and an interpolation processing circuit for performing interpolation according to the four pieces of pixel information corresponding to the four directions with the use of the interpolation coefficients determined by the coefficient determination circuit.

The foregoing object is achieved in another aspect of the present invention through the provision of an image processing method for processing the output signal of a solid-state imaging device having a color filter with the specified color arrangement on a light receiving plane, comprising the steps of: calculating, according to four pieces of pixel information in four directions which form angles multiples of 90 degrees with each other, the right, left, upper, and lower directions, from a pixel to be interpolated, correlation values in the four directions; determining interpolation coefficients according to the calculated correlation values in the four directions; and performing interpolation processing according to the four pieces of pixel information corresponding to the four directions with the use of the determined interpolation coefficients.

In the image processing apparatus and the image processing method, characteristic values, namely, correlation values which indicate the degrees of correlation, of a pixel to be interpolated in a total of four directions, the right and left directions (horizontal direction) and the upper and lower directions (vertical direction), are first calculated. Then, according to the correlation values in these four directions, interpolation coefficients used for interpolation are determined. The four pieces of pixel information in the four directions, which are used for calculating the correlation values, are multiplied by the interpolation coefficients and summed up to implement interpolation processing.

The foregoing object is achieved in yet another aspect of the present invention through the provision of a camera including: a solid-state imaging device having a color filter with the specified color arrangement on a light receiving plane; an optical system for forming an image of an object by incident light on the light receiving plane of the solid-state imaging device; and an image processing apparatus for processing the output signal of the solid-state imaging device, the image processing apparatus having: a correlation-value calculation circuit for calculating, according to four pieces of pixel information in four directions which form angles multiples of 90 degrees with each other, the right, left, upper, and lower directions, from a pixel to be interpolated, correlation values in the four directions; a coefficient determination circuit for determining interpolation coefficients according to the correlation values in the four directions calculated by the correlation-value calculation circuit; and an interpolation processing circuit for performing interpolation according to the four pieces of pixel information with the use of the interpolation coefficients determined by the coefficient determination circuit.

As described above, according to the present invention, when the output signal of a solid-state imaging device having a color filter on a light receiving plane is processed, since, according to four pieces of pixel information in four directions, the right, left, upper, and lower directions, from a pixel to be interpolated, correlation values are calculated in the four directions; interpolation coefficients are determined according to the calculated correlation values in the four directions; and interpolation processing is performed according to the four pieces of pixel information with the use of the determined interpolation coefficients, the degrees of correlation can be successfully determined even for an edge disposed in a direction not perpendicular to any of the directions for which the correlation values are calculated. Therefore, a diagonal edge is successfully shown without any blur after interpolation processing and successful interpolation is performed at a broken or bent line and a right-angled corner.

DESCRIPTION OF THE PREFERRED EMBODIMENTS

Figure 1:
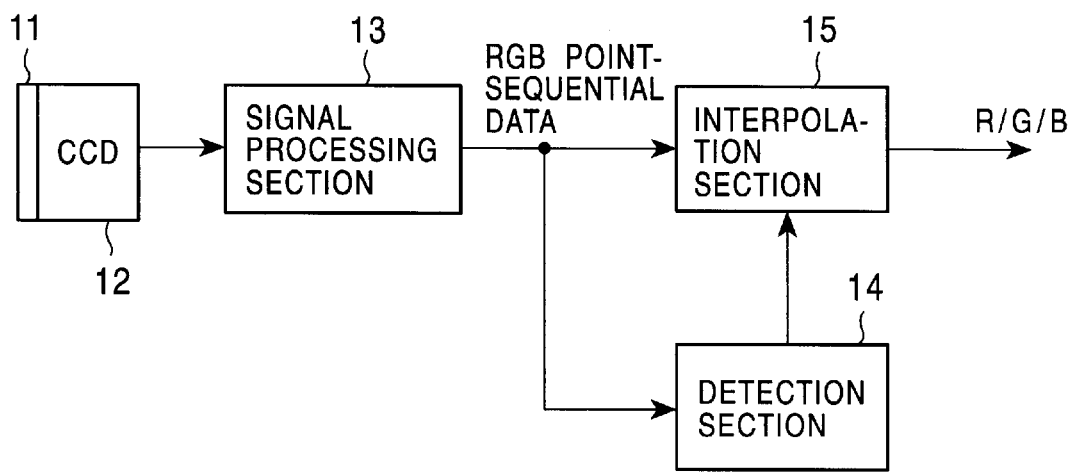
FIG. 1 is a block diagram of a basic configuration of an image processing apparatus according to an embodiment of the present invention.

Embodiments of the present invention will be described in detail by referring to the drawings. FIG. 1 is a block diagram showing a basic configuration of an image processing apparatus according to the present invention. A color single-chip solid-state imaging device 12, for which the image processing apparatus performs processing, has a color filter 11 with, for example, a Bayer color arrangement of primary colors of red (R), green (G), and blue (B) shown in FIG. 2.

The color arrangement is limited to neither the Bayer arrangement of primary colors nor the arrangement of the primary colors of RGB. A color arrangement of other primary colors and a color arrangement of complementary colors such as yellow, cyan, magenta, and green can also be applied in the same way. As the solid-state imaging device 12, a so-called all-pixel-read charge coupled device (hereinafter called a CCD area sensor), which independently reads the signal charges of all pixels, is used. A CCD area sensor which does not employ the all-pixel-read method can also be applied.

A signal processing section 13 applies signal processing such as black-level clamping and white balance to an RGB point-sequential data output from the CCD area sensor 12 and sends the data to a detection section 14 and an interpolation section 15. The detection section 14 detects the most appropriate interpolation method from the input RGB point-sequential data and sends interpolation information to the interpolation section 15. The interpolation section 15 applies interpolation processing to the RGB point-sequential data according to the interpolation information input from the detection section 14, and outputs the result.

Figure 3:
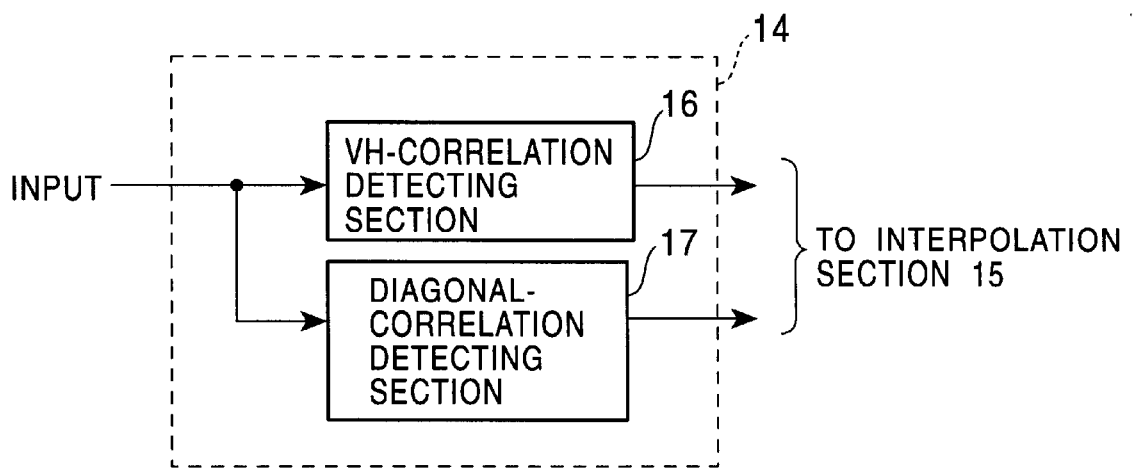
FIG. 3 is a block diagram of a configuration of a detection section.

The detection section 14 is formed, as shown in FIG. 3, of a VH-correlation detecting section 16 for detecting the degrees of correlation in four directions which form angles multiples of 90 degrees with each other, the right, left, upper, and lower directions, from a pixel to be interpolated (hereinafter called an interpolation pixel), namely, the two opposite directions in the vertical (V) direction and the two opposite directions in the horizontal (H) direction; and a diagonal-correlation detecting section 17 for detecting the degrees of correlation in four directions which form an angle of 45 degrees with the former four directions.

In the present embodiment, the degrees of correlation in a total of eight directions, the right, left, upper and lower directions plus four diagonal directions, are detected. The degrees of correlation may be detected only in four directions, the right, left, upper, and lower directions. In the following description, a case in which the degrees of correlation are detected in eight directions is taken as an example.

Figure 4:
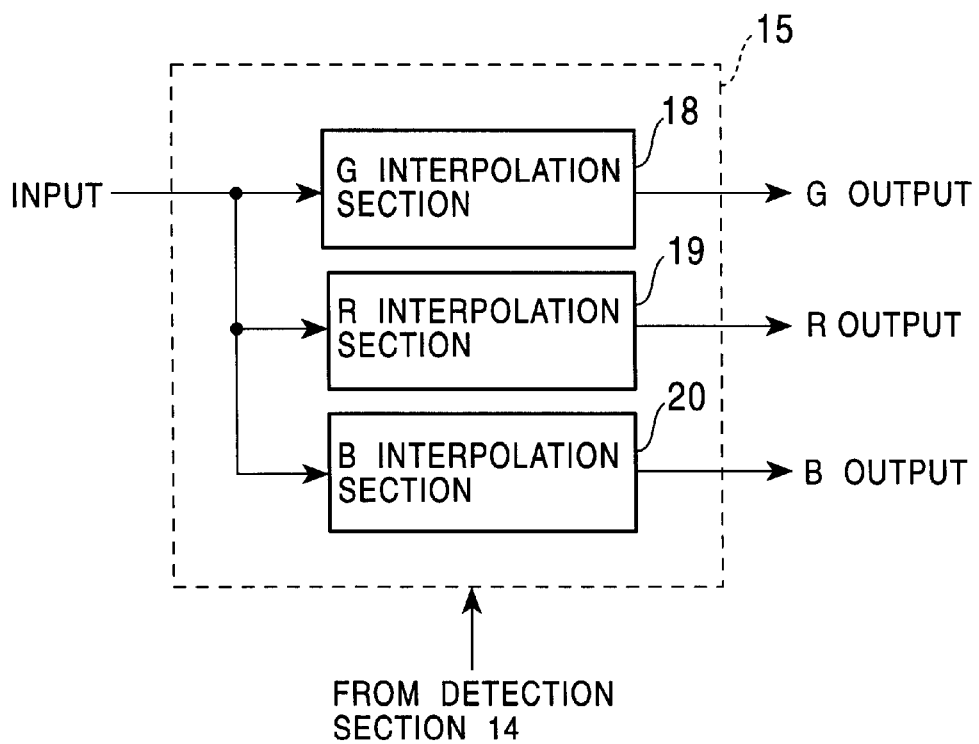
FIG. 4 is a block diagram of a configuration of an interpolation section.

The interpolation section 15 is formed, as shown in FIG. 4, of a G interpolation section 18 for applying interpolation processing to G pixel information, an R interpolation section 19 for applying interpolation processing to R pixel information, and a B interpolation section 20 for applying interpolation processing to B pixel information, according to the interpolation information given from the detection section 14.

Figure 5:
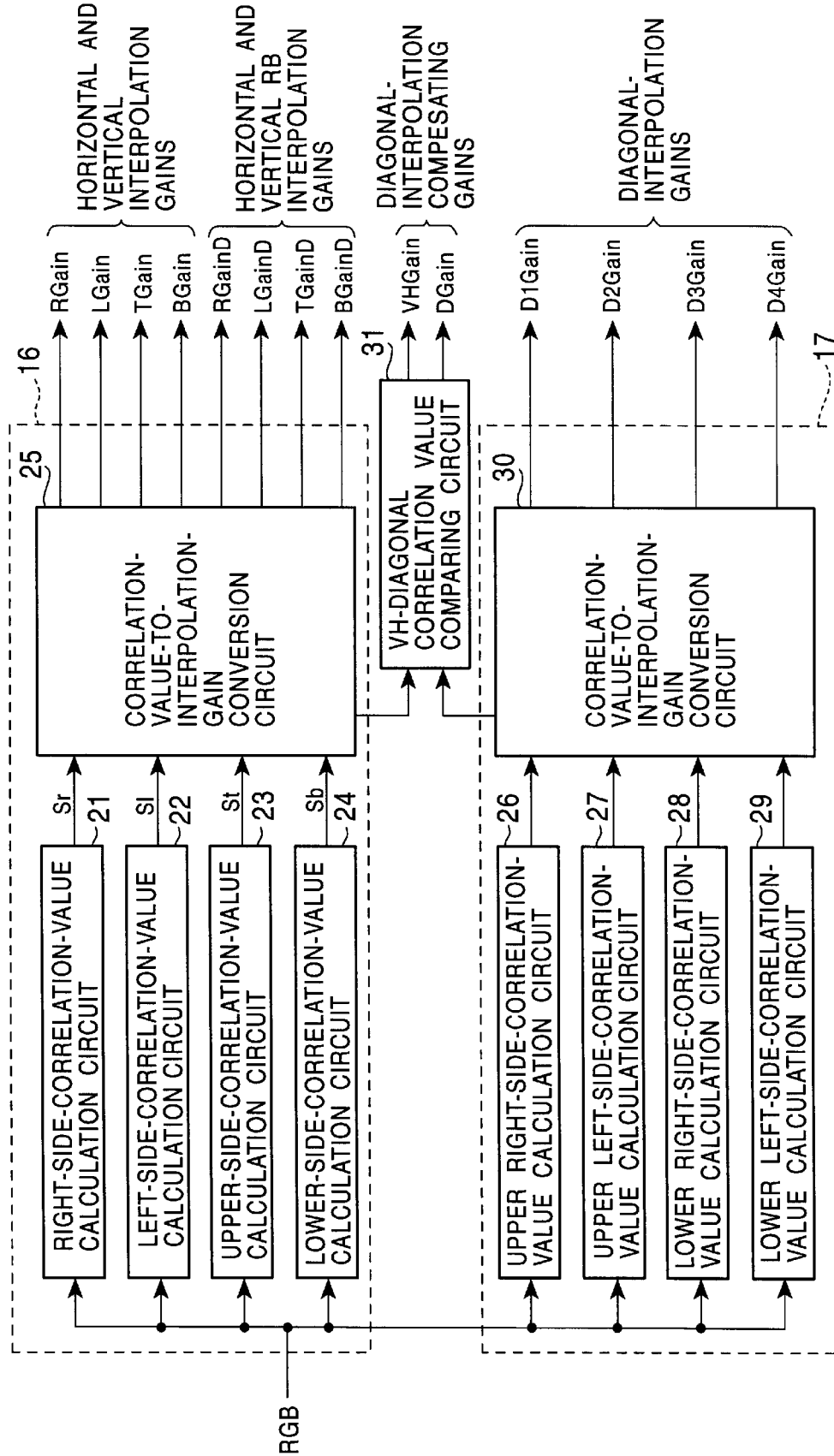
FIG. 5 is a block diagram of a specific configuration of a VH-correlation detecting section and a diagonal-correlation detecting section.

FIG. 5 is a block diagram of a specific configuration of the VH-correlation detecting section 16 and the diagonal-correlation detecting section 17.

The VH-correlation detecting section 16 is formed of a right-side-correlation-value calculation circuit 21 for calculating a correlation value which indicates the degree of correlation according to pixel information of the pixel disposed at the right side of the interpolation pixel; a left-side-correlation-value calculation circuit 22 for calculating a correlation value according to pixel information of the pixel disposed at the left side of the interpolation pixel; an upper-side-correlation-value calculation circuit 23 for calculating a correlation value according to pixel information of the pixel disposed at the upper side of the interpolation pixel; a lower-side-correlation-value calculation circuit 24 for calculating a correlation value according to pixel information of the pixel disposed at the lower side of the interpolation pixel; and a correlation-value-to-interpolation-gain conversion circuit 25 for converting each of the correlation values calculated in these correlation-value calculation circuits 21 to 24 to interpolation gains and for outputting the gains.

In the VH-correlation detecting section 16 having the above configuration, the correlation-value-to-interpolation-gain conversion circuit 25 outputs horizontal and vertical interpolation gains, RGain, LGain, TGain, and BGain, and horizontal and vertical RB interpolation gains, RGainD, LGainD, TGainD, and BGainD as interpolation coefficients. The horizontal and vertical RB interpolation gains, RGainD, LGainD, TGainD, and BGainD, will be later described in detail.

The diagonal-correlation detecting section 17 is formed of an upper-right-side-correlation-value calculation circuit 26 for calculating a correlation value according to pixel information of the pixel disposed at the upper right side of the interpolation pixel; an upper-left-side-correlation-value calculation circuit 27 for calculating a correlation value according to pixel information of the pixel disposed at the upper left side of the interpolation pixel; a lower-right-side-correlation-value calculation circuit 28 for calculating a correlation value according to pixel information of the pixel disposed at the lower right side of the interpolation pixel; a lower-left-side-correlation-value calculation circuit 29 for calculating a correlation value according to pixel information of the pixel disposed at the lower left side of the interpolation pixel; and a correlation-value-to-interpolation-gain conversion circuit 30 for converting each of the correlation values calculated in these correlation-value calculation circuits 26 to 29 to an interpolation gain and for outputting the diagonal-interpolation gains D1Gain, D2Gain, D3Gain, and D4Gain as interpolation coefficients.

Since the four horizontal and vertical directions and the four diagonal directions are not perpendicular to each other, a VH-diagonal correlation-value comparing circuit 31 is provided to compare the correlation values in the horizontal and vertical directions with the correlation values in the diagonal directions to calculate diagonal-interpolation compensating gains VHGain and DGain as interpolation coefficients. A method for calculating these diagonal-interpolation compensating gains VHGain and DGain will be later described in detail.

Figure 6:
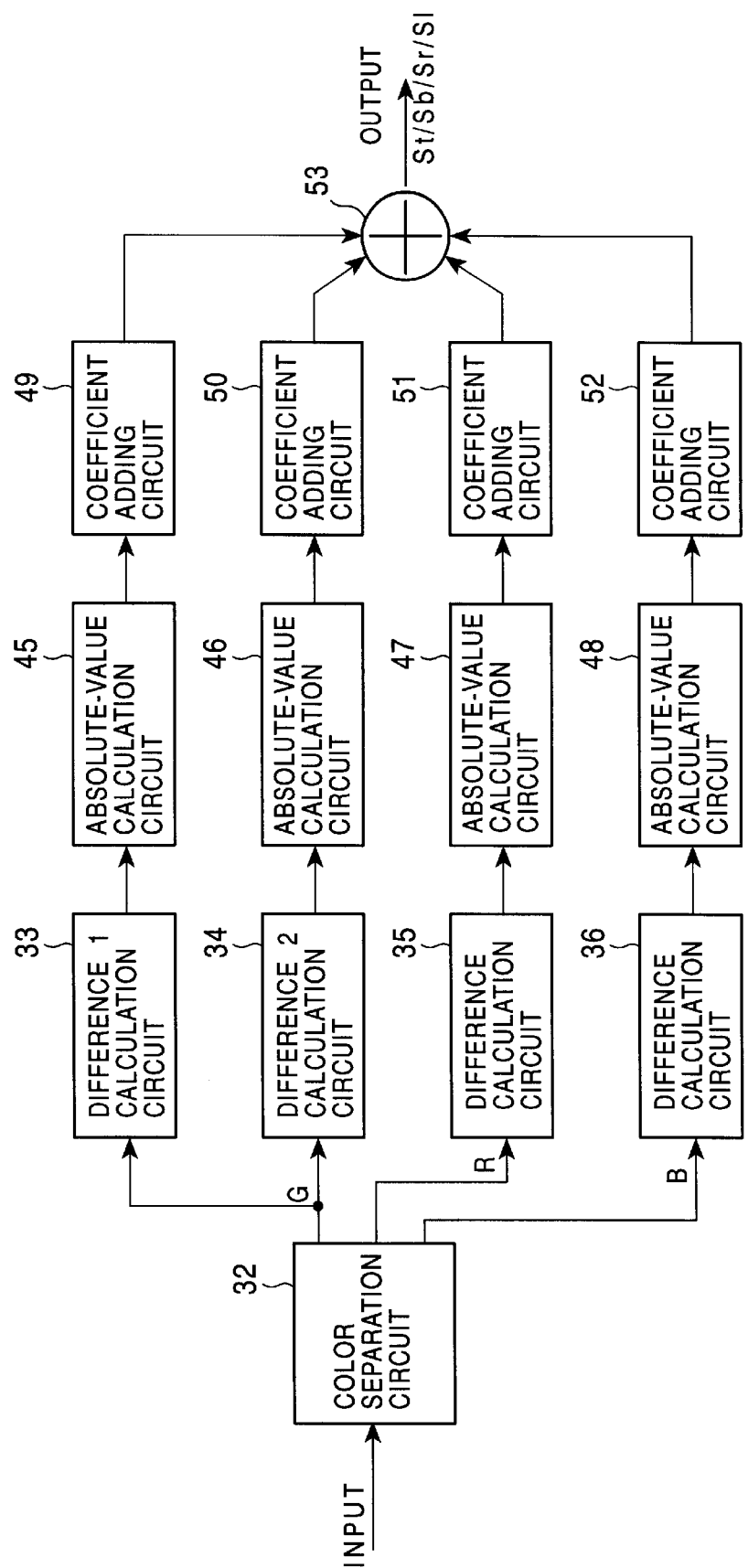
FIG. 6 is a block diagram of a specific configuration of a correlation-value calculation circuit.

FIG. 6 is a block diagram of a specific configuration of the left-side-correlation-value calculation circuit 22 in the VH-correlation detecting section 16. The right-side-correlation-value calculation circuit 21, the upper-side-correlation-value calculation circuit 23, and the lower-side-correlation-value calculation circuit 24 have the same circuit configuration as the left-side-correlation-value calculation circuit 22.

In the left-side-correlation-value calculation circuit 22, the input RGB point-sequential signal is divided into the R signal, the G signal, and the B signal corresponding to the colors of an R pixel, a G pixel, and a B pixel, respectively, and output by a color separation circuit 32.

The G signal is sent to a difference 1 calculation circuit 33 and a difference 2 calculation circuit 34. The R signal is sent to a difference calculation/circuit 35, and the B signal is sent to a difference calculation circuit 36.

Figure 2:
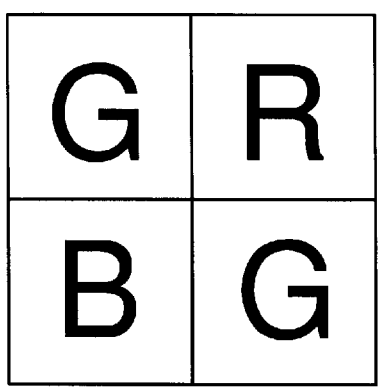
FIG. 2 is a view showing a Bayer arrangement of primary colors in a color filter.

The reason why only the G signal is sent to the two different calculation circuits 33 and 34 is that, as understood from the Bayer arrangement of primary colors of R, G, and B in FIG. 2, the G signal has double the sampling counts of the R and B signals in the horizontal and vertical directions, and a difference 1 between G signals at adjacent vertical lines and a difference 2 between G signals at vertical lines one-line apart are calculated. In the present embodiment, adjacent vertical lines and vertical lines one-line apart are used. Vertical lines two or more lines apart may be used.

Figures 7, 8:
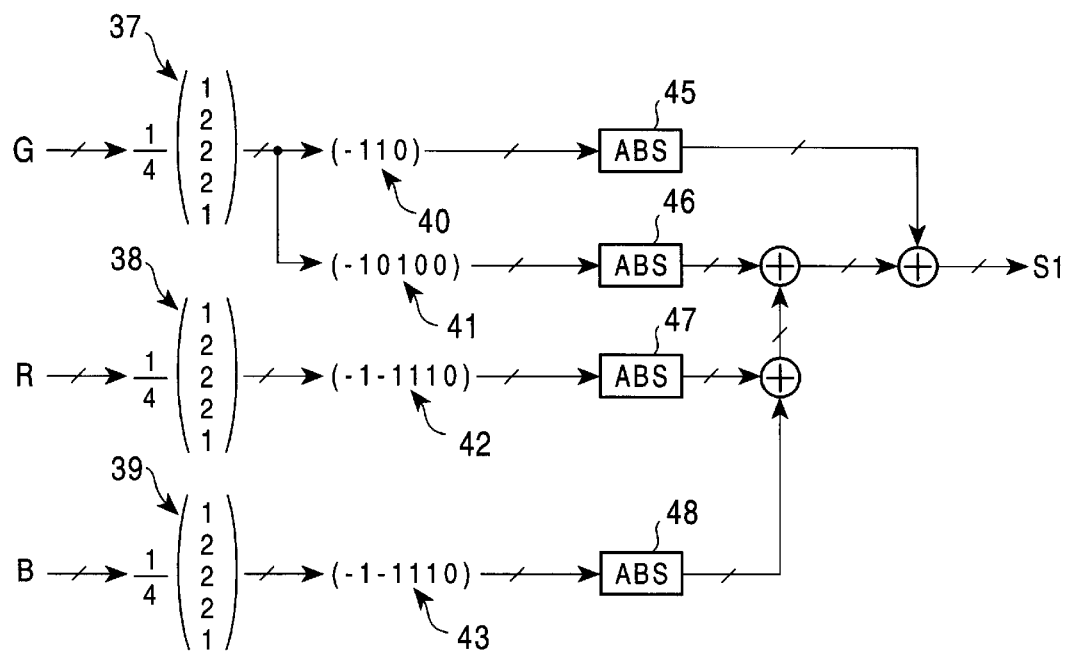
FIG. 7 is a conceptual view of difference calculation.
FIG. 8 is a view of a Bayer arrangement of primary colors used for describing a difference calculation method.

In the difference 1 calculation circuit 33, the difference 2 calculation circuit 34, and the difference calculation circuits 35 and 36, as shown in the conceptual view of FIG. 7, signals pass through low-pass filters (LPFs) (1, 2, 2, 2, 1) 37, 38, and 39 which are disposed perpendicularly to the direction in which the differences are calculated, and then pass through calculation band-pass filters (BPFs) 40, 41, 42, and 43 for difference calculation.

The calculation BPFs 40, 41, 42, and 43 use half correlation (1, −1) and one-fourth correlation (1, 0, −1) for the G signal, and one-fourth correlation (1, 1, −1, −1) for the R and B signals.

The differences calculated by these difference calculation circuits 33, 34, 35, and 36 are made to the absolute values in absolute-value calculation circuits 45, 46, 47, and 48 and sent to coefficient adding circuits 49, 50, 51, and 52. The coefficient adding circuits 49, 50, 51, and 52 multiply the differences made to the absolute values by the absolute-value calculation circuits 45, 46, 47, and 48 by coefficients specified separately, respectively, and output the results. The outputs of the coefficient adding circuits 49, 50, 51, and 52 are added in an adder circuit 53 and output as correlation values St, Sb, Sl, and Sr in the upper, lower, left, and right directions. In this case, the R and B components are divided by four and added to reduce the contribution of the R and B components to correlation values to be lower than that of the G component.

The coefficient adding circuits 49, 50, 51, and 52 multiply the differences by the coefficients so as to match the human visual-sense characteristics, as in a case in which 0.30R+0.59G+0.11B is calculated to generate luminance from R, G, and B color signals in the NTSC television system. It is preferred that the ratio of R, G, and B be simple to reduce the amount of calculation and the size of gates, such as 3:6:1, 1:2:1, or 2:4:1.

A method for calculating a difference in the left direction by the difference calculation circuits 33 to 36 in the left-side-correlation-value calculation circuit 22 having the above configuration will be described below by referring to a view of a Bayer arrangement of primary colors shown in FIG. 8. A method for calculating a difference in each of other directions (right, upper, and lower directions) is the same as the method for calculating a difference in the left direction, with subscripts being changed.

A difference between G signals at adjacent vertical lines is calculated by an expression (1) and a difference between G signals at vertical lines one-line apart is calculated by an expression (2). The expressions (1) and (2) are used to detect correlation for a pixel G22. On the other hand, since R signals and B signals are generated at different every other vertical lines, a difference between R signals at vertical lines one-line apart is calculated by an expression (3), and a difference between B signals at vertical lines one-line apart is calculated by an expression (4). A for a pixel G33, subscripts indicating horizontal and vertical lines are incremented by one, and the calculation methods used for the R and B signals are switched.

$$\frac{G02 + 2 \times G22 + G42}{4} - \frac{G11 + G31}{2} \quad (1)$$

$$\frac{G02 + 2 \times G22 + G42}{4} - \frac{G00 + 2 \times G20 + G40}{4} \quad (2)$$

$$\frac{R03 + 2 \times R23 + R43}{4} - \frac{R01 + 2 \times R21 + R41}{4} \quad (3)$$

-continued $$\frac{B12 + B32}{2} - \frac{B10 + B30}{2} \quad (4)$$

In the VH-correlation detecting section 16 shown in FIG. 5, the correlation-value-to-interpolation-gain conversion circuit 25 serving as a circuit for determining correlation coefficients first determines a correlation mode according to the correlation values Sr, Sl, St, and Sb in the four directions calculated by the correlation-value calculation circuits 21 to 24 before determining correlation coefficients. The reason why the correlation mode is introduced is that it is difficult to determine correlation coefficients correspondingly to the grades of correlation if correlation values are arranged just in the order of their grades.

For example, correlation coefficients should be different in a case in which four correlation values are substantially the same, such as (100, 101, 102, 103), and in a case in which the four correlation values are totally different, such as (0, 10, 100, 500). Therefore, the correlation mode which indicates the distribution of correlation coefficients is introduced separately from correlation-grade determination. The correlation mode indicates the distributions of the four correlation values Sr, Sl, St, and Sb. As shown in Table 1, the correlation mode includes eight modes from 0 to 7.

TABLE 1

| Grade | Mode | | | | | | | |
|---|---|---|---|---|---|---|---|---|
| | 0 | 1 | 2 | 3 | 4 | 5 | 6 | 7 |
| 0 | 4 | 3 | 2 | 2 | 1 | 1 | 1 | 1 |
| 1 | 0 | 1 | 2 | 1 | 3 | 2 | 1 | 1 |
| 2 | 0 | 0 | 0 | 1 | 0 | 1 | 2 | 1 |
| 3 | 0 | 0 | 0 | 0 | 0 | 0 | 0 | 1 |

Figure 9:
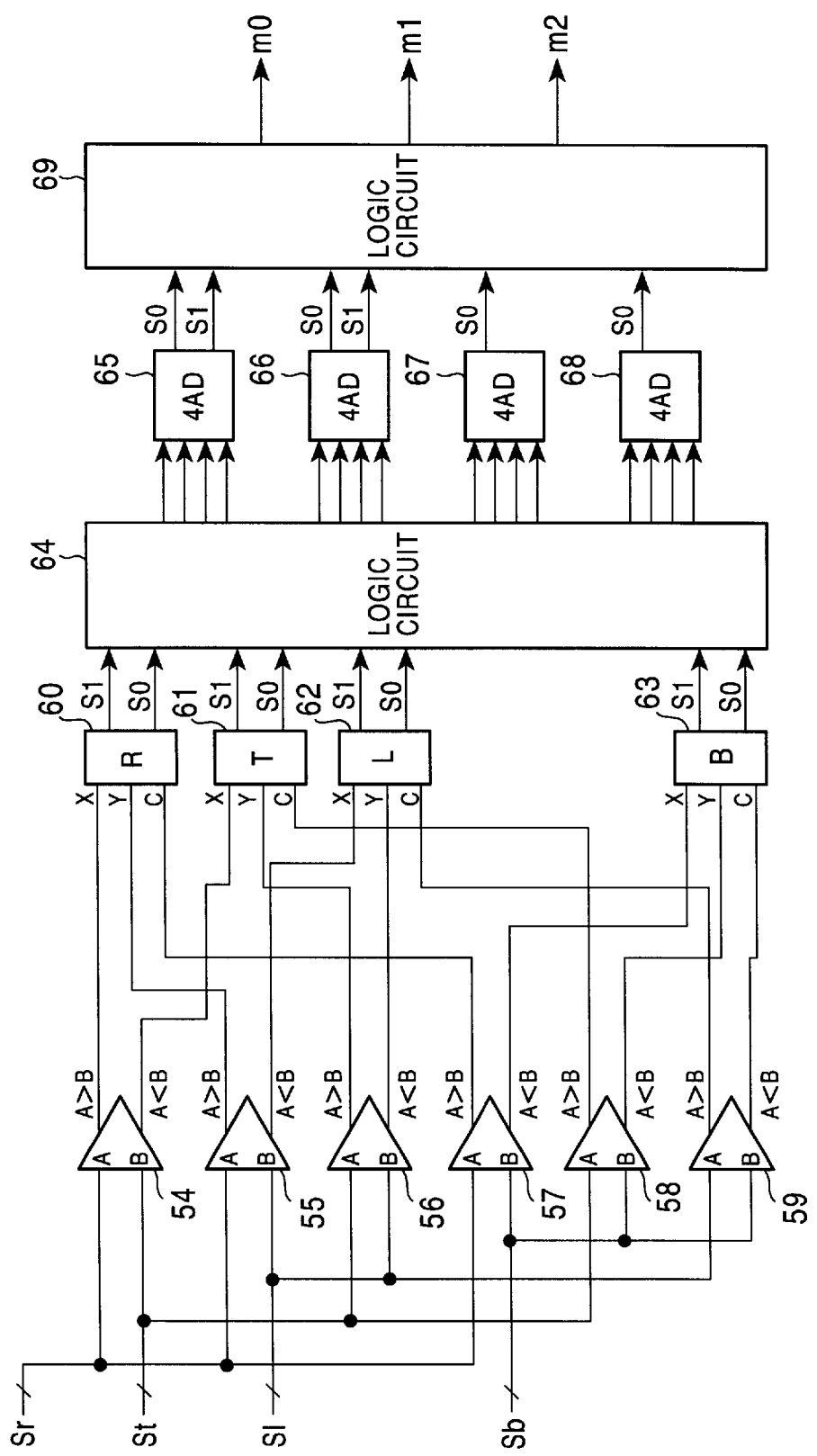
FIG. 9 is a block diagram of a specific configuration of a correlation-mode determination circuit.

FIG. 9 is a block diagram of a specific configuration of a correlation-mode determination circuit for determining the correlation mode.

In FIG. 9, six comparators 54 to 59 are provided in order to compare the four correlation values Sr, St, Sl, and Sb. The right-side correlation value Sr serves as the comparison inputs A of the comparators 54, 55, and 57. The upper-side correlation value St serves as the comparison input B of the comparator 54 and also as the comparison imputs A of the comparators 56 and 58. The left-side correlation value Sl serves as the comparison inputs B of the comparators 55 and 56 and also as the comparison input A of the comparator 59. The lower-side correlation value Sb server as the comparison inputs B of the comparators 57, 58, and 59.

Figure 10:
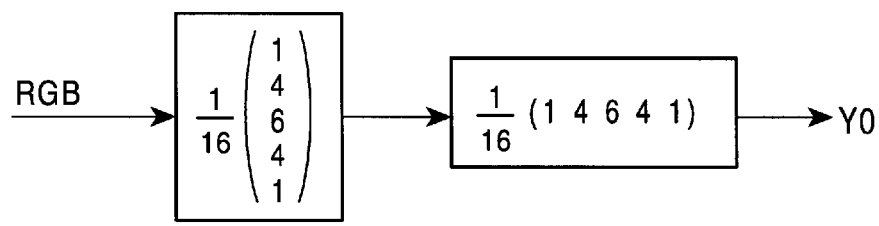
FIG. 10 is a conceptual view of luminance Y0 detection.

The comparators 54 to 59 compare two comparison inputs A and B and output the results in three levels, ">" (larger), "=" (equal), and "<" (smaller). In other words, in addition to two comparison results A>B and A<B, A=B is output when the absolute value of the difference between two compared correlation values is smaller than a predetermined reference value TH. As the predetermined reference value TH, an average level or a weighted average level of pixels in the vicinity of the interpolation pixel is used. For example, luminance Y0 in the vicinity of the interpolation pixel multiplied by a predetermined coefficient is used. FIG. 10 is a conceptual view of luminance Y0 detection.

At the subsequent stage of the comparators 54 to 59, four one-bit full adders 60 to 63 corresponding to the right, upper, left, and lower sides are provided. The full adder 60 receives the comparison result A>B of the comparator 54 at one addition input X, the comparison result A>B of the comparator 55 at the other addition input Y, and the comparison result A>B of the comparator 57 at a carry input C. The full adder 61 receives the comparison result A<B of the comparator 54 at one addition input X, the comparison result A>B of the comparator 56 at the other addition input Y, and the comparison result A>B of the comparator 58 at a carry input C.

The full adder 62 receives the comparison result A<B of the comparator 55 at one addition input X, the comparison result A<B of the comparator 56 at the other addition input Y, and the comparison result A>B of the comparator 59 at a carry input C. The full adder 63 receives the comparison result A<B of the comparator 57 at one addition input X, the comparison result A<B of the comparator 58 at the other addition input Y, and the comparison result A<B of the comparator 59 at a carry input C. Each of the full adders 60 to 63 determines its grade according to two addition inputs X and Y and a carry input C, and outputs determination results S0 and S1.

The determination results S0 and S1 are sent to four four-input adders 65 to 68 through a logic circuit 64.

Among the adders 65 to 68, the adders 65 and 66 each output two addition outputs S0 and S1, and the adders 67 and 68 each output one addition output S1, to a logic circuit 69.

The logic circuit 69 outputs a mode signal in three bits, m0, m1, and m2 according to the two addition outputs S0 and S1 of each of the adders 65 and 66 and the one addition output S0 of each of the adders 67 and 68. One of eight modes is determined based on the mode signal, m0, m1, and m2.

In the correlation-mode determination circuit having the above configuration, the four correlation values Sr, Sl, St, and Sb are compared to obtain comparison results in three levels (">," "=," and "<"), and the correlation values are graded according to the comparison results and lower numbers starting from 0 are assigned to smaller values. In this case, correlation values in two directions or in four directions may be graded at the same level. According to the grade distribution and Table 1, the correlation mode is determined. In the cases of modes 1, 2, 5, and 6, grade distribution may differ from that shown in the table. In the mode 1, for example, grade 0 is assigned to correlation values in three directions and a grade of 1, 2, or 3 is assigned to the correlation value in the other one direction.

Ranks are then decided based on the correlation grades. For convenience, ranks are different from correlation grades. In the ranks, an order is assigned even to correlation values in directions having the same correlation grade. If correlation values have the same correlation grade, an order is assigned clockwise from the right-side position. When all correlation values in the upper, lower, right, and left directions have the same correlation grade, the correlation values in the right, upper, left, and lower have ranks of 0, 1, 2, and 3, respectively.

As described above, in the correlation-value-to-interpolation-gain conversion circuit 25, the correlation mode and the ranks are determined when correlation coefficients are calculated, and the interpolation coefficient of each rank is calculated according to the combination of the correlation mode and the ranks to determine an interpolation coefficient in each direction, namely, the horizontal and vertical interpolation gains RGain, LGain, TGain, and BGain, and the horizontal and vertical RB interpolation gains RGainD, LGainD, TGainD, and BGainD.

When the interpolation coefficients are calculated, the correlation-value-to-interpolation-gain conversion circuit 25 changes the method for calculating the interpolation coefficients according to the determined correlation mode. In other words, the four correlation values Sr, Sl, St, and Sb in the four horizontal and vertical directions are called S0, S1, S2, and S3 from the smallest, a variable α (0≦α≦¼) is obtained according to this order from, for example, a look-up table (LUT) in each mode, and interpolation coefficients are calculated with the use of the variable α.

Figure 11:
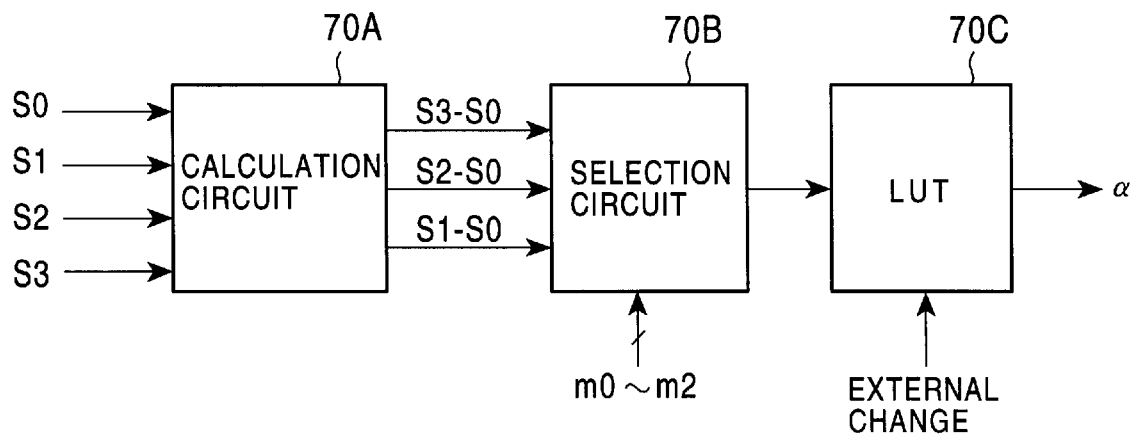
FIG. 11 is a block diagram of a specific configuration of a circuit for calculating a variable $\alpha$.

In other words, as shown in FIG. 11, the four correlation values S0 to S3 are input to a calculation circuit 70A to obtain three calculation outputs, S3−S0, S2−S0, and S1−S0. One of the three calculation outputs, S3−S0, S2−S0, and S1−S0, is selected according to each mode determined by the three-bit mode signal, m0 to m2, and sent to a look-up table 70C.

In the look-up table 70C, the variable α is set to 0 in the mode 0, the variable α is set to the value of S3−S0 in the mode 1, the variable α is set to the value of S2−S0 in the modes 2 and 3, and the variable α is set to the value of S1−S0 in the modes 4 to 7. Interpolation coefficients are calulated with the use of the variable α, as shown in Table 2. When the table values of the look-up table 70C can be changed externally, the variable α can be set to any value.

TABLE 2

| Mode | Rank | | | |
|---|---|---|---|---|
| | 0 | 1 | 2 | 3 |
| 0 | 1/4 | 1/4 | 1/4 | 1/4 |
| 1 | 1/4 + α/2 | 1/4 + α/4 | 1/4 + α/4 | 1/4 − α |
| 2 | 1/4 + α | 1/4 + α | 1/4 − α | 1/4 − α |
| 3 | 3/8 + α/2 | 3/8 + α/2 | 1/4 − α | 0 |
| 4 | 1/4 + 3α | 1/4 − α | 1/4 − α | 1/4 − α |
| 5 | 1/2 + 2α | 1/4 − α | 1/4 − α | 0 |
| 6 | 1/2 + 2α | 1/2 − 2α | 0 | 0 |
| 7 | 1/2 + 2α | 1/2 − 2α | 0 | 0 |

Correlation detection in the four horizontal and vertical directions has been described. In correlation detection in the four diagonal directions, the absolute values of modulation components in the diagonal directions are calculated for each of the R, G, and B signals obtained after color separation, and they are added at a ratio of R:G:B=1:4:1 to make relative values. The upper right direction, the upper left direction, the lower left direction, and the lower right direction are called a D1 direction, a D2 direction, a D3 direction, and a D4 direction, respectively. In the correlation-value-to-interpolation-gain conversion circuit 30 shown in FIG. 5, the interpolation gains, D1Gain, D2Gain, D3Gain, and D4Gain, in the four diagonal directions are calculated as interpolation coefficients in the same way as for the four horizontal and vertical directions.

Figure 12:
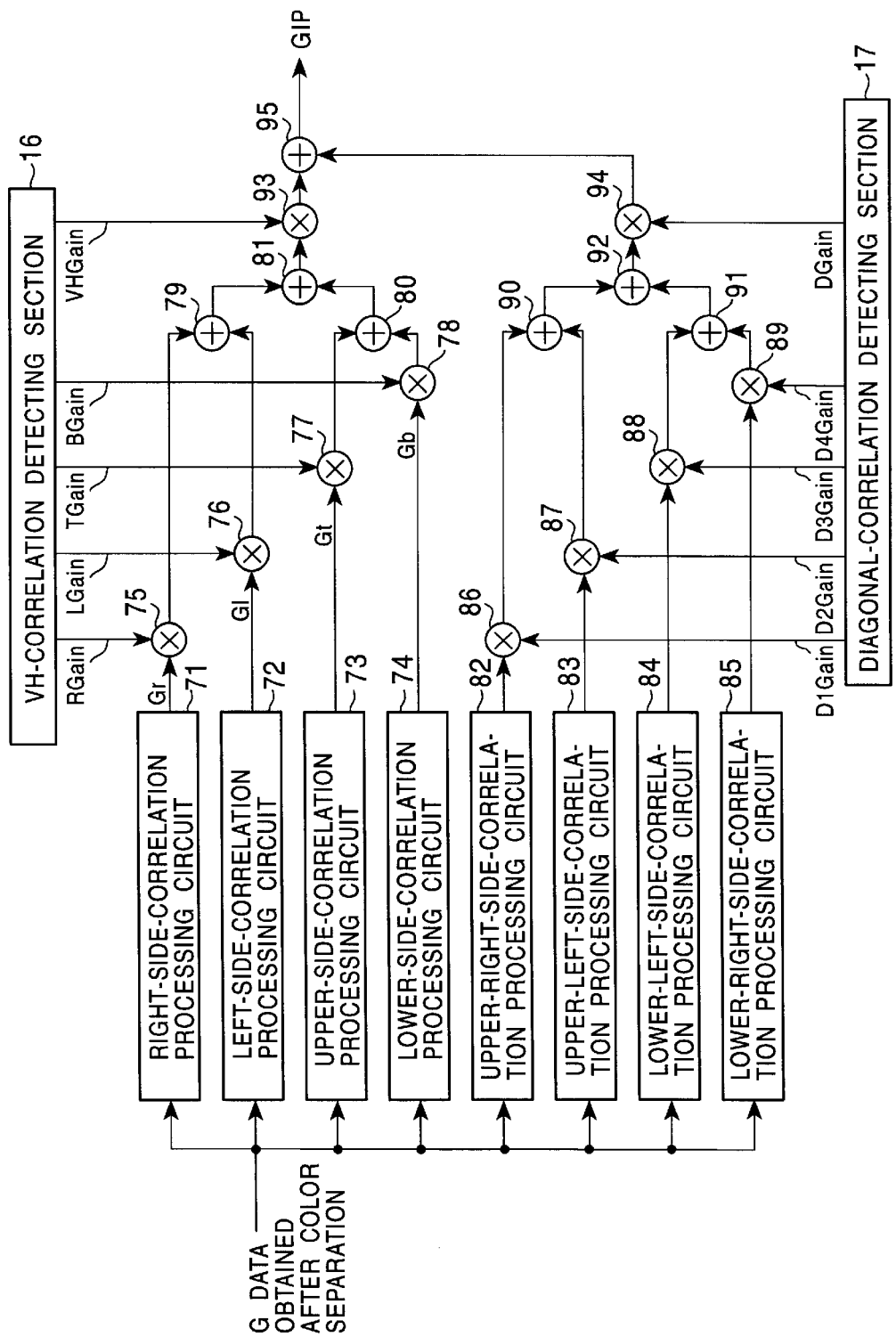
FIG. 12 is a block diagram of a specific configuration of a G interpolation section.
Figure 13:
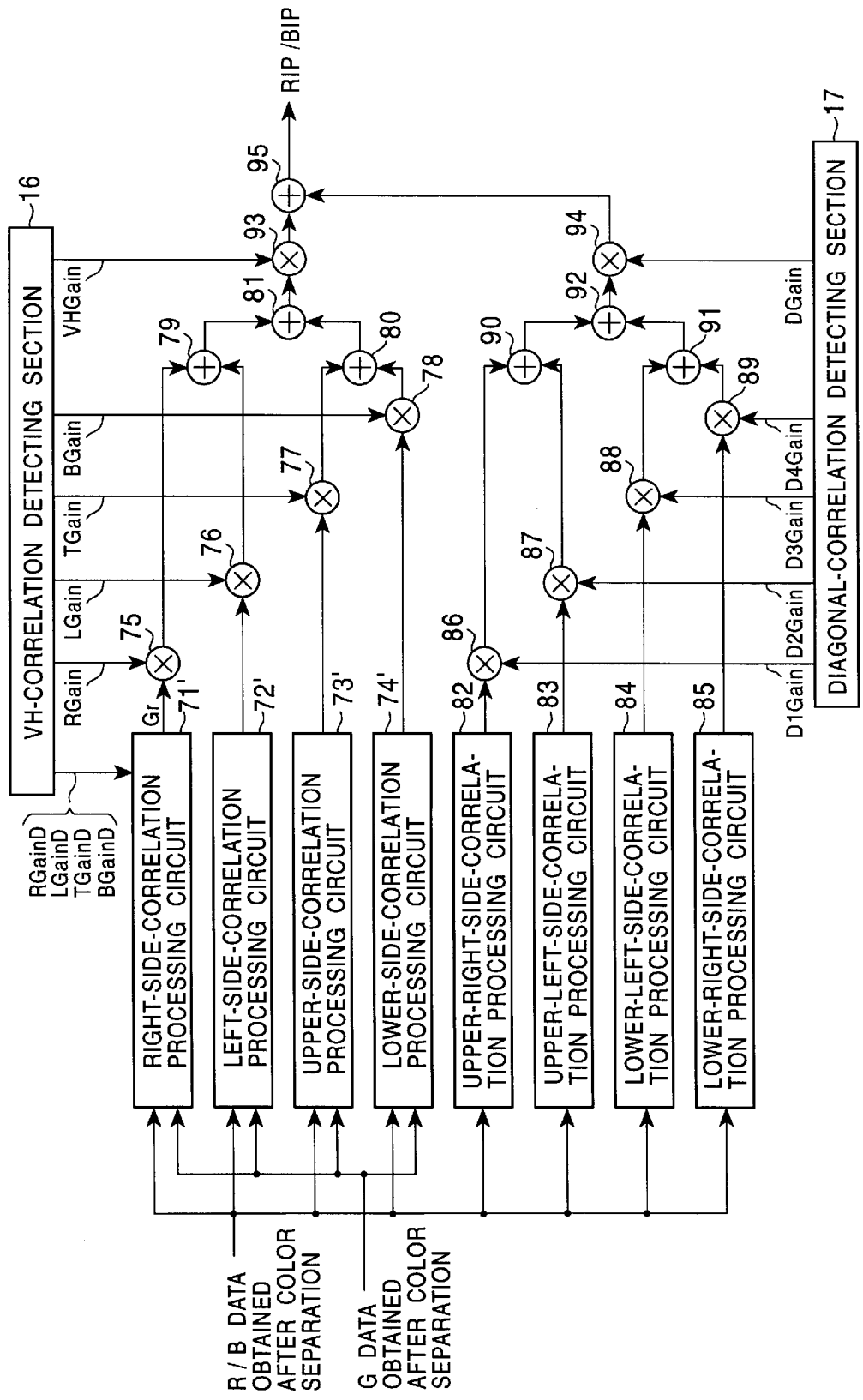
FIG. 13 is a block diagram of a specific configuration of R and B interpolation sections.

FIGS. 12 and 13 show specific configurations of the G interpolation section 18, the R interpolation section 19, and the B interpolation section 20 in the interpolation section 15 shown in FIG. 4. FIG. 12 shows a configuration of the G interpolation section 18 and FIG. 13 shows a configuration of the R interpolation section 19 and the B interpolation section 20.

In FIG. 12, the G data obtained after color separation is sent to four-horizontal-and-vertical-direction, namely, right-side, left-side, upper-side, and lower-side, correlation processing circuits 71, 72, 73, and 74 to generate interpolation data Gr, Gl, Gt, and Gb in the four directions. The interpolation data Gr, Gl, Gt, and Gb is generated by passing the G data through low-pass filters (LPFs) in interpolation directions. The interpolation data Gr, Gl, Gt, and Gb is actually generated by providing two LPFs for high luminance and low luminance, and multiplying the outputs of the LPFs by predetermined gains and summing them up.

The interpolation data Gr, Gl, Gt, and Gb is multiplied by the interpolation coefficients determined by the VH-correlation detecting section 16 shown in FIG. 5, namely, the horizontal and vertical interpolation gains, RGain, LGain, TGain, and BGain, in multipliers 75, 76, 77, and 78. The results are summed up by adders 79 to 81 to implement G interpolation processing. G image data obtained after interpolation processing is expressed by an expression (5).

$$G = Gr \times RGain + Gl \times LGain + Gt \times TGain + Gb \times BGain \quad (5)$$

In the same way, interpolation data in the D1, D2, D3, and D4 directions is generated in four-diagonal-direction, namely, upper-right-side, upper-left-side, lower-left-side, and lower-right-side, correlation processing circuits 82, 83, 84, and 85. The data is multiplied by the diagonal interpolation gains, D1Gain, D2Gain, D3Gain, and D4Gain, determined by the diagonal-correlation detecting section 17 shown in FIG. 5, in multipliers 86, 87, 88, and 89, and summed up in adders 90 to 92 to complete interpolation processing.

The G image data obtained by correlation detection and interpolation in the four horizontal and vertical directions and the G image data obtained by correlation detection and interpolation in the four diagonal directions are added with a combination ratio being changed according to a situation as shown in an expression (6). The combination ratio is adjusted by diagonal-interpolation compensating gains VHGain and DGain calculated in the VH-diagonal correlation value comparing circuit 31 shown in FIG. 5.

$$G = Gvh \times VHGain + Gd \times DGain \quad (6)$$

Since the horizontal and vertical directions are not perpendicular to the diagonal directions, the differences (S3−S0) between the maximum values S3 and the minimum values S0 of the correlation values in the horizontal and vertical directions and the diagonal directions are compared, and the interpolation coefficients corresponding to the larger difference are increased so as to become larger than the interpolation coefficients corresponding to the smaller difference. This is because the difference between the maximum and the minimum of correlation values becomes large for an edge parallel to or perpendicular to any of the detection directions. When the correlation values in the horizontal and vertical directions are compared with those in the diagonal directions, horizontal and vertical interpolation is usually performed with an offset being given to the horizontal and vertical calculated values, and interpolation coefficients in the diagonal directions are increased only in a case diagonal interpolation is appropriate.

Figure 14:
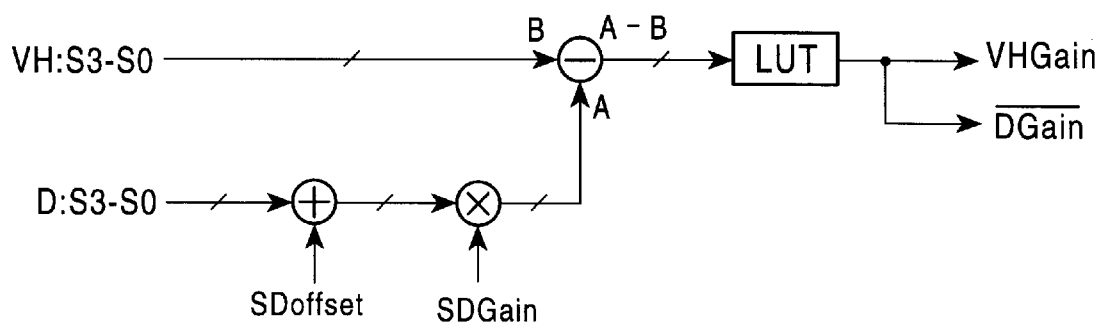
FIG. 14 is a conceptual view of calculating diagonal-interpolation compensating gains.

When the differences (S3−S0) between the maximum values S3 and the minimum values S0 of the correlation values in the horizontal and vertical directions and the diagonal directions are compared, a predetermined constant SDoffset is added to (or subtracted from) the difference (S3−S0) in the diagonal directions, the resultant value is multiplied by a coefficient SDGain, the product A is compared with the difference B (S3−S0) in the horizontal and vertical directions, and the diagonal-interpolation compensating gains VHGain and DGain are specified according to the difference (A−B), as shown in a conceptual view of FIG. 14.

In other words, in FIG. 12, the output data of the adder 81 is multiplied by a diagonal-interpolation compensating gain VHGain in the multiplier 93, and the output data of the adder 92 is multiplied by a diagonal-interpolation compensating gain DGain in the multiplier 94.

The outputs of the multipliers 93 and 94 are added in the adder 95 to obtain a combination (addition) of the G image data obtained by correlation detection and interpolation in the four horizontal and vertical directions and the G image data obtained by correlation detection and interpolation in the four diagonal directions at the predetermined ratio.

The configuration and operation of the G interpolation section 18 have been described. The configurations of the R interpolation section and the B interpolation section shown in FIG. 13 are basically the same as that of the G interpolation section 18 shown in FIG. 12. Therefore, the same symbols as those used in FIG. 12 are assigned to the corresponding similar portions in FIG. 13. A method for generating interpolation data in right-side, left-side, upper-side, and lower-side correlation processing circuits 71', 72', 73', and 74' is more complicated than that for the G data because correlation detection for RB interpolation is performed and a G/2 component is added to RB data.

Correlation detection for RB interpolation is performed separately for horizontal (right and left) interpolation data and vertical (upper and lower) interpolation data. Specifically, the R signal and the B signal are interpolated from signals of R pixels and B pixels with the use of the horizontal and vertical RB interpolation gains RGainD, LGainD, TGainD, and BGainD calculated as interpolation coefficients dedicated to the R and B data. Interpolation processing for the R signal will be described below as an example. Interpolation processing for the B signal is the same as that for the R signal.

In the color filter 11 having the Bayer arrangement of the primary colors of R, G, and B, as understood from its color arrangement shown in FIG. 2, the G signal has the same spatial sampling count in the horizontal or vertical directions as that in the entire pixels of the CCD area sensor 12 whereas the R and B signals have smaller spatial sampling counts in the horizontal or vertical directions than that in the entire pixels of the CCD area sensor 12.

Figure 15:
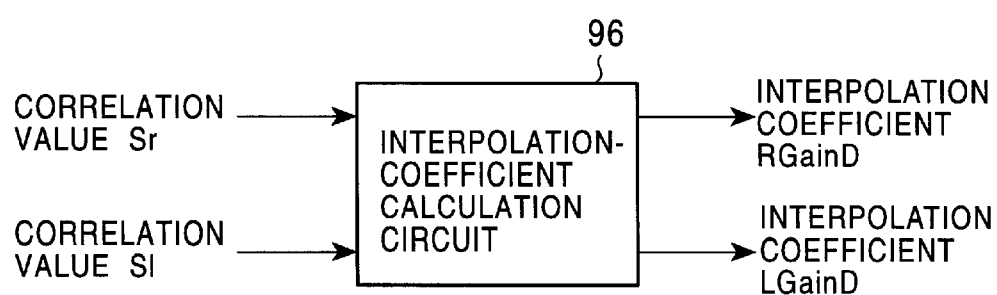
FIG. 15 is a view showing a configuration for calculating horizontal and vertical RB interpolation coefficients.

In the Bayer arrangement of the primary colors shown in FIG. 8, when a pixel R21 is to be interpolated, no special processing is required and the signal of R21 is used as the R signal as is. When a pixel G22 is to be interpolated, the pixel R21 is used for left-side interpolation, a pixel R23 is used for right-side interpolation, and an interpolation-coefficient calculation circuit 96 shown in FIG. 15 is used for upper-side interpolation and lower-side interpolation. The interpolation-coefficient calculation circuit 96 forms a part of the correlation-value-to-interpolation-gain conversion circuit 25 in the VH-correlation detecting section 16 shown in FIG. 5.

Figure 16:
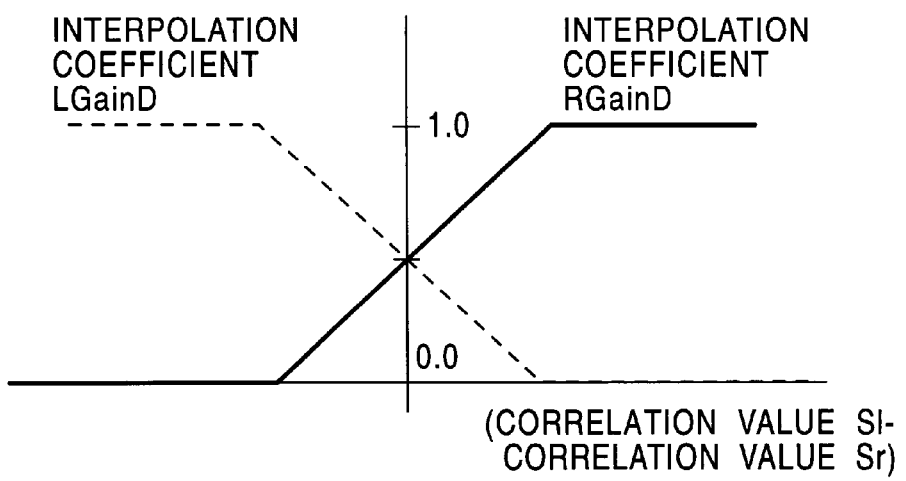
FIG. 16 is a view of a characteristic of an interpolation-coefficient calculation circuit.

In other words, in the VH-correlation detecting section 16, the right-side correlation value Sr calculated in the right-side-correlation-value calculation circuit 21 and the left-side correlation value Sl calculated in the left-side-correlation-value calculation circuit 22 are input to the interpolation-coefficient calculation circuit 96 to calculate a right-side interpolation coefficient RGainD and a left-side interpolation coefficient LGainD. FIG. 16 shows a characteristic of the interpolation-coefficient calculation circuit 96. In the characteristic shown in FIG. 16, the interpolation coefficients range from 0.0 to 1.0. The interpolation coefficients can be any values and actually, it is necessary that the R signal multiplied by an interpolation coefficient ranges from 0.0 to 1.0. The right-side interpolation coefficient RGainD and the left-side interpolation coefficient LGainD calculated as described above are input to the right-side-correlation processing circuit 71' and the left-side-correlation processing circuit 72' shown in FIG. 13. The correlation processing circuits 71' and 72' perform predetermined calculation to output upper-side interpolation data TData and lower-side interpolation data BData with the use of the following expressions.

$$TData = R01 \times LGainD + R03 \times RGainD$$

$$BData = R41 \times LGainD + R43 \times RGainD$$

Alternatively, the following expressions can be considered.

$$TData = \{(R01+R21) \times LGainD + (R03+R23) \times RGainD\}/2$$

$$BData = \{(R21+R41) \times LGainD + (R23+R43) \times RGainD\}/2$$

When a pixel G33 is to be interpolated, an upper-side interpolation coefficient TGainD and a lower-side interpolation coefficient BGainD are calculated from an upper-side correlation value St and a lower-side correlation value Sb in the same processing method as described above, and right-side interpolation data RData and left-side interpolation data LData are calculated, for example, in the following calculation expressions.

$$LData = R21 \times TGainD + R41 \times BGainD$$

$$RData = R25 \times TGainD + R45 \times BGainD$$

When a pixel B32 is to be interpolated, an upper-side interpolation coefficient TGainD and a lower-side interpolation coefficient BGainD are calculated from an upper-side correlation value St and a lower-side correlation value Sb, and a right-side interpolation coefficient RGainD and a left-side interpolation coefficient LGainD are calculated from a right-side correlation value Sr and a left-side correlation value Sl. Upper-side interpolation data TData, lower-side interpolation data, left-side interpolation data LData, and right-side interpolation data RData are calculated in the following calculation expressions.

$$TData = R21 \times LGainD + R23 \times RGainD$$

$$BData = R41 \times LGainD + R43 \times RGainD$$

$$LData = R21 \times TGainD + R41 \times BGainD$$

$$RData = R23 \times TGainD + R43 \times BGainD$$

As described above, correlation detection for RB interpolation is performed separately for the horizontal (right and left) interpolation data and the vertical (upper and lower) interpolation data. The right-side correlation value Sr and the left-side correlation value Sl are compared (Sl–Sr) to calculate the interpolation coefficients LGainD and RGainD for the interpolation data in the horizontal directions. The upper-side correlation value St and the lower-side correlation value Sb are compared (Sl–Sr) to calculate the interpolation coefficients TGainD and BGainD for the interpolation data in the vertical directions.

According to the interpolation coefficients TGainD, BGainD, LGainD, and RGainD, the upper-side interpolation data TData, the lower-side interpolation data BData, the left-side interpolation data LData, and the right-side interpolation data RData are calculated. They are multiplied by the horizontal and vertical interpolation coefficients TGain, BGain, LGain, and RGain and summed up to generate the R signal.

A case in which the upper-side interpolation data Tdata for the R signal is generated is taken as an example. Since R information is obtained in every other pixels in the horizontal and vertical directions in the original image, if an R pixel is to be interpolated, the data of that R pixel is used, and if a Gb pixel is to be interpolated, because an R pixel is disposed at the upper side, the data of the upper-side R pixel is used as the upper-side interpolation data.

If a B or Gr pixel is to be interpolated, since R information is not obtained on the vertical line, upper-side interpolation data TData is generated according to the data of R pixels in the right and left vertical lines and the ½ modulation component of a G pixel. Specifically, the data of an R pixel on the right-side vertical line and the ½ modulation component of a G pixel at the right side in the horizontal direction are added and multiplied by RGainD as a coefficient. The data of an R pixel on the left-side vertical line and the ½ modulation component of a G pixel at the left side in the horizontal direction are added and multiplied by LGainD as a coefficient. Both results are added to generate the upper-side interpolation data TData.

In the Bayer arrangement of the primary colors shown in FIG. 8, when the R signal corresponding to the pixel G22 is interpolated, there is no problem in horizontal interpolation since R pixels are disposed at both sides and R information is thin, but in vertical interpolation, since only G signals and B signals are obtained in the same vertical line, such as those from G02, B12, G22, B32, and G42, an R signal in an adjacent vertical line needs to be used.

When an image of a vertical edge in which a signal level drastically changes in the horizontal direction is taken, the edge may be located between the vertical line of G22 and an adjacent vertical line, for example, that of R23. In this case, although an R signal at the position of G22 should have the same level as those of R01, R21, and R41, since the R signal of R03, R23, or R43 is used, the signal level differs from the actual level and the edge may have a color.

In the signal processing for the Bayer arrangement of the primary colors, as described above, since the interpolation coefficients LGainD and RGainD for the interpolation data in the horizontal direction are calculated according to the right-side correlation value Sr and the left-side correlation value Sl, and the interpolation coefficients TGainD and BGainD for the interpolation data in the vertical direction are calculated according to the upper-side correlation value St and the lower-side correlation value Sb to interpolate the R and B signals from R and B pixels, generating a color (a wrong color signal) at an edge is suppressed and the resolution and the impression of resolution are improved by correlation detection and interpolation in the four directions.

Figure 17:
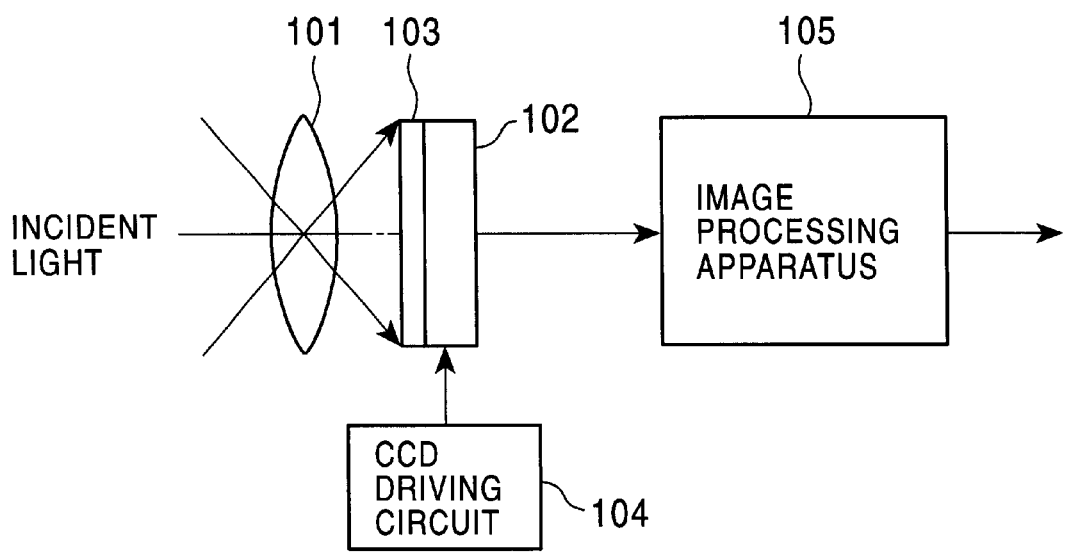
FIG. 17 is an outlined configuration view of a camera according to the present invention.

FIG. 17 is an outlined configuration view of a camera according to the present invention. In FIG. 17, incident light reflected from an object forms an image on a light receiving plane (imaging plane) of a CCD area sensor 102 by an optical system including a lens 101. On the light receiving plane of the CCD area sensor 102, a color filter 103 having, for example, the Bayer color arrangement of primary colors is provided. The CCD area sensor 102 is driven and controlled by a CCD driving circuit 104 for exposure, signal-charge reading, signal-charge transfer, and so on.

The output signal of the CCD area sensor 102 is sent to an image processing apparatus 105 and various types of signal processing are applied to the signal. As the image processing apparatus 105, the image processing apparatus according to the above embodiment is used, which detects correlation in the eight horizontal, vertical, and diagonal directions and performs adaptive interpolation processing according to the detection results.

As described above, since the camera employing the CCD area sensor 102 having the color filter 103 with, for example, the Bayer arrangement of the primary colors as an imaging device detects correlation in the eight horizontal, vertical, and diagonal directions and performs adaptive interpolation processing according to the detection results, even if each color is disposed not continuously on the color filter 103, since the impression of the resolution is not reduced and successful interpolation processing is performed for a broken or bent line and an right-angled corner, a more successful image is taken.

What is claimed is:

1. An image processing apparatus for processing the output signal of a solid-state imaging device having a color filter with a specified color arrangement, comprising:

a correlation-value calculation circuit for calculating correlation values according to at least four pieces of pixel information adjacent to a pixel to be interpolated, the four pieces of pixel information being positioned in four directions from the pixel to be interpolated, and which form angles of 90 degrees with each other;

a coefficient determination circuit for determining interpolation coefficients according to the correlation values in the four directions calculated by said correlation-value calculation circuit; and an interpolation processing circuit for performing interpolation according to the four pieces of pixel information and the interpolation coefficients and for generating image data in accordance with said interpolation;

wherein said coefficient determination circuit determines a correlation mode according to a magnitude relationship among the correlation values in the four directions and selects one of a plurality of calculating procedures for calculating the interpolation coefficients according to the correlation mode.

2. The image processing apparatus according to claim 1, wherein said coefficient determination circuit compares the magnitudes of the correlation values in the four directions and determines whether each interpolation coefficient is larger than, equal to, or smaller than, the other interpolation coefficients.

3. The image processing apparatus according to claim 2, wherein said coefficient determination circuit determines the correlation mode using an average level or a weighted average level of pixels in the vicinity of the pixel to be interpolated.

4. The image processing apparatus according to claim 1, wherein said correlation-value calculation circuit calculates correlation values according to pixel information in a total of eight directions, including the first-mentioned four pieces of pixel information in the four directions, and in addition, a second set of four pieces of pixel information in four directions which form angles of 45 degrees with the directions of the first-mentioned four pieces of pixel information.

5. The image processing apparatus according to claim 4, wherein said coefficient determination circuit determines first-system interpolation coefficients from the correlation values based on the first-mentioned four pieces of pixel information and determines second-system interpolation coefficients from the correlation values based on the second set of four pieces of pixel information.

6. The image processing apparatus according to claim 1, wherein said interpolation processing circuit multiplies the four pieces of pixel information by the interpolation coefficients and sums the products.

7. An image processing apparatus for processing the output signal of a solid-state imaging device having a color filter with a specified color arrangement, comprising:

a correlation-value calculation circuit for calculating correlation values according to at least four pieces of pixel information adjacent to a pixel to be interpolated, the four pieces of pixel information being positioned in four directions from the pixel to be interpolated, and which form angles of 90 degrees with each other;

a coefficient determination circuit for determining interpolation coefficients according to the correlation values in the four directions calculated by said correlation-value calculation circuit; and an interpolation processing circuit for performing interpolation according to the four pieces of pixel information and the interpolation coefficients and for generating image data in accordance with said interpolation;

wherein said interpolation processing circuit generates first image data by interpolation processing based on the first-system interpolation coefficients and generates second image data by interpolation processing based on the second-system interpolation coefficients.

8. The image processing apparatus according to claim 7, wherein said interpolation processing circuit adds the first and second image data at a specified ratio to produce a combination image data.

9. The image processing apparatus according to claim 8, wherein said coefficient determination circuit compares differences between maximum correlation values and minimum correlation values used for generating the first and second image data and provides the interpolation coefficients corresponding to the image data having the larger correlation values.

10. The image processing apparatus according to claim 9, wherein said coefficient determination circuit compares a first value obtained by multiplying a coefficient by a value acquired by adding a specified constant to, or subtracting a specified constant from, the difference between the maximum correlation value and the minimum correlation value obtained based on the second four pieces of pixel information with a second value obtained by multiplying a coefficient by a value acquired by adding a specified constant to, or subtracting a specified constant from, the difference between the maximum correlation value and the minimum correlation value obtained based on the first four pieces of pixel information, in order to compare the differences between the maximum correlation values and the minimum correlation values.

11. An image processing apparatus for processing the output signal of a solid-state imaging device having a color filter with a specified color arrangement, comprising:

a correlation-value calculation circuit for calculating correlation values according to at least four pieces of pixel information adjacent to a pixel to be interpolated, the four pieces of pixel information being positioned in four directions from the pixel to be interpolated, and which form angles of 90 degrees with each other;

a coefficient determination circuit for determining interpolation coefficients according to the correlation values in the four directions calculated by said correlation-value calculation circuit; and an interpolation processing circuit for performing interpolation according to the four pieces of pixel information and the interpolation coefficients and for generating image data in accordance with said interpolation;

wherein said coefficient determination circuit includes an interpolation-coefficient calculation circuit for calculating an interpolation coefficient for a certain color having a pixel density in two opposite directions smaller than a pixel density of the pixels for the other colors of the solid-state imaging device by comparing correlation values in two opposite directions for the certain colors color.

12. The image processing apparatus according to claim 11, wherein said certain color is selected from red and blue, said color filter having a Bayer arrangement of red, green, and blue primary colors.

13. An image processing method for processing the output signal of a solid-state imaging device having a color filter with a specified color arrangement, comprising the steps of:

calculating correlation values, according to at least four pieces of pixel information adjacent to a pixel to be interpolated, the four pieces of pixel information being positioned in four directions from the pixel to be interpolated, and which form angles of 90 degrees with each other;

determining interpolation coefficients according to the calculated correlation values in the four directions;

performing interpolation processing according to the four pieces of pixel information and the determined interpolation coefficients;

generating image data in accordance with said interpolation; and determining a correlation mode according to a magnitude relationship among the correlation values in the four directions and selecting one of a plurality of calculating procedures for calculating the interpolation coefficients according to the correlation mode.

14. The image processing method according to claim 13, wherein said interpolation processing is performed by multiplying the four pieces of pixel information by the interpolation coefficients and summing the products.

15. The image processing method according to claim 13, wherein correlation values are calculated according to pixel information in a total of eight directions, including the first-mentioned four pieces of pixel information in the four directions and in addition, a second set of four pieces of pixel information in four directions which form angles of 45 degrees with the four directions of the first-mentioned four pieces of pixel information.

16. A camera comprising:

a solid-state imaging device having a color filter with a specified color arrangement;

an optical system for forming an image of an object on said solid-state imaging device; and an image processing apparatus for processing an output signal of said solid-state imaging device, said image processing apparatus including:

a correlation-value calculation circuit for calculating correlation values according to at least four pieces of pixel information adjacent to a pixel to be interpolated, the four pieces of pixel information being positioned in four directions from the pixel to be interpolated, and which form angles of 90 degrees with each other;

a coefficient determination circuit for determining interpolation coefficients according to the correlation values in the four directions calculated by said correlation-value calculation circuit;

an interpolation processing circuit for performing interpolation according to the four pieces of pixel information and the interpolation coefficients and for generating image data in accordance with said interpolation; and determining a correlation mode according to a magnitude relationship among the correlation values in the four directions and selecting one of a plurality of calculating procedures for calculating the interpolation coefficients according to the correlation mode.

17. The camera according to claim 16, wherein the interpolation processing circuit multiplies the four pieces of pixel information by the interpolation coefficients and sums the products.

18. The camera according to claim 16, wherein said correlation-value calculation circuit calculates correlation values according to pixel information in a total of eight directions, including the first-mentioned four pieces of pixel information in the four directions, and in addition, a second set of four pieces of pixel information in four directions which form angles of 45 degrees with the directions of the first-mentioned four pieces of pixel information.

* * * * *